United States Patent
Kumar

(10) Patent No.: US 10,110,869 B2
(45) Date of Patent: Oct. 23, 2018

(54) REAL-TIME COLOR PREVIEW GENERATION FOR PLENOPTIC IMAGING SYSTEMS

(71) Applicant: Aashish Kumar, Cupertino, CA (US)

(72) Inventor: Aashish Kumar, Cupertino, CA (US)

(73) Assignee: Ricoh Company, LTD., Tokyo (JP)

( * ) Notice: Subject to any disclaimer, the term of this patent is extended or adjusted under 35 U.S.C. 154(b) by 0 days.

(21) Appl. No.: 15/453,891

(22) Filed: Mar. 8, 2017

(65) Prior Publication Data
US 2018/0262734 A1    Sep. 13, 2018

(51) Int. Cl.
*H04N 5/335* (2011.01)
*H04N 9/76* (2006.01)
*H04N 5/232* (2006.01)
*H04N 9/097* (2006.01)
*H04N 9/04* (2006.01)
*G02B 3/00* (2006.01)
*G02B 5/20* (2006.01)

(52) U.S. Cl.
CPC ............ *H04N 9/76* (2013.01); *G02B 3/0056* (2013.01); *H04N 5/23293* (2013.01); *H04N 9/045* (2013.01); *H04N 9/097* (2013.01); *G02B 5/201* (2013.01)

(58) Field of Classification Search
CPC .......... H04N 9/76; H04N 9/097; H04N 9/045; H04N 5/23293; G02B 3/0056
USPC .................................................. 348/272, 239
See application file for complete search history.

(56) References Cited

U.S. PATENT DOCUMENTS

| 2010/0128145 | A1* | 5/2010 | Pitts | H04N 5/23212 348/231.99 |
| 2010/0141802 | A1* | 6/2010 | Knight | H04N 5/23212 348/240.3 |
| 2011/0149125 | A1* | 6/2011 | Morimoto | H04N 5/225 348/272 |

(Continued)

OTHER PUBLICATIONS

Chai, J.-X. et al., "Plenoptic Sampling," Presented at the SIG-GRAPH '00: Proceedings of the 27th Annual Conference on Computer Graphics and Interactive Techniques, ACM Press/Addison-Wesley Publishing Co., 2000, pp. 307-318, May be retrieved at URL<https://dl.acm.org/citation.cfm?id=344932>.

(Continued)

*Primary Examiner* — Sinh Tran
*Assistant Examiner* — Zhenzhen Wu
(74) *Attorney, Agent, or Firm* — Fenwick & West LLP

(57) ABSTRACT

A color preview image is generated, preferably in real-time, for a plenoptic imaging system. The raw plenoptic image has a structure containing superpixels and also contains different color channels. For a principal color channel, a center view is generated by determining the pixel value for a center view of the superpixel, i.e. at the centroid of the superpixel. For each of the other color channels, the ratio of that color channel to the principal color channel is calculated for each superpixel. A center view for each non-principal color channel is determined by multiplying the color ratios times the pixel values for the principal color center view. These center views for the principal and non-principal color channels are combined into a color preview image. The calculations preferably can be performed in real-time at video rates.

20 Claims, 8 Drawing Sheets

(56) References Cited

U.S. PATENT DOCUMENTS

2015/0339824 A1* 11/2015 Uliyar .................. G06T 7/0055
                                                     348/46
2016/0241797 A1*  8/2016 Ye ...................... G02B 27/2214
2016/0260205 A1   9/2016 Namboodiri et al.
2017/0084034 A1   3/2017 Meng et al.

OTHER PUBLICATIONS

Yu, Z. et al., "An Analysis of Color Demosaicing in Plenoptic Cameras," Presented at IEEE Conference on Computer Vision and Pattern Recognition, IEEE Publishing, 2012, pp. 901-308, May be retrieved at URL<http://ieeexplore.ieee.org/document/6247764/>.

* cited by examiner

REAL-TIME COLOR PREVIEW GENERATION FOR PLENOPTIC IMAGING SYSTEMS

BACKGROUND OF THE INVENTION

1. Field of the Invention

This disclosure relates generally to the generation of plenoptic images, including plenoptic video.

2. Description of the Related Art

The plenoptic imaging system has recently received increased attention. It can be used to recalculate a different focus point or point of view of an object, based on digital processing of the captured plenoptic image. The plenoptic imaging system also finds application in estimating depth to three-dimensional objects that are imaged by the plenoptic imaging system, possibly followed by three-dimensional reconstruction of those objects or the entire three-dimensional scene.

However, the amount of image processing required to generate the final processed images from the raw plenoptic images can be significant and often cannot be done at video rates in real-time. However, without the processed images, it can be difficult for the plenoptic camera user to know where the camera is pointed and what images are being captured. A conventional viewfinder can be used, but that typically requires additional optics and/or electronics.

Thus, there is a need for preview generation for plenoptic imaging systems, including for systems that capture plenoptic color video.

SUMMARY OF THE INVENTION

The present disclosure overcomes the limitations of the prior art by generating color preview images from the plenoptic images captured by a plenoptic imaging system. The preview generation preferably is computationally simple enough that it can be done in real-time for plenoptic video systems.

In one aspect, a color preview image is generated from a plenoptic image captured by a plenoptic imaging system. A typical plenoptic imaging system includes a microlens array and a sensor array, and the captured plenoptic image has a structure with superpixels corresponding to the microlenses. The plenoptic imaging system uses a color sensor array, which includes subarrays of different color sensors (e.g., red, green and blue). Accordingly, the captured plenoptic image also has different color channels captured by the different color sensors.

For one of the color channels, which will be referred to as the principal color channel, a principal color center view is generated by determining pixel values at the centroids of the superpixels. Typically, the principal color is the color which has the highest resolution (e.g. largest number of sensors) in the sensor array. In a Bayer sensor, the green channel is preferred as the principal color. For each of the other color channels, a ratio comparing the pixel values of the non-principal color channels to the pixel values of the principal color channel is determined for each superpixel. These ratios are applied to the principal color center view to generate center views for each non-principal color channel. The center views for all of the color channels are combined to create a color preview image for the plenoptic imaging system. Optionally, if the plenoptic imaging system is capturing video, the color preview images are generated in real-time at a same frame rate as the video capture.

Other aspects include components, devices, systems, improvements, methods, processes, applications, computer readable mediums, and other technologies related to any of the above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention has other advantages and features which will be more readily apparent from the following detailed description of the invention and the appended claims, when taken in conjunction with the accompanying drawings, in which:

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
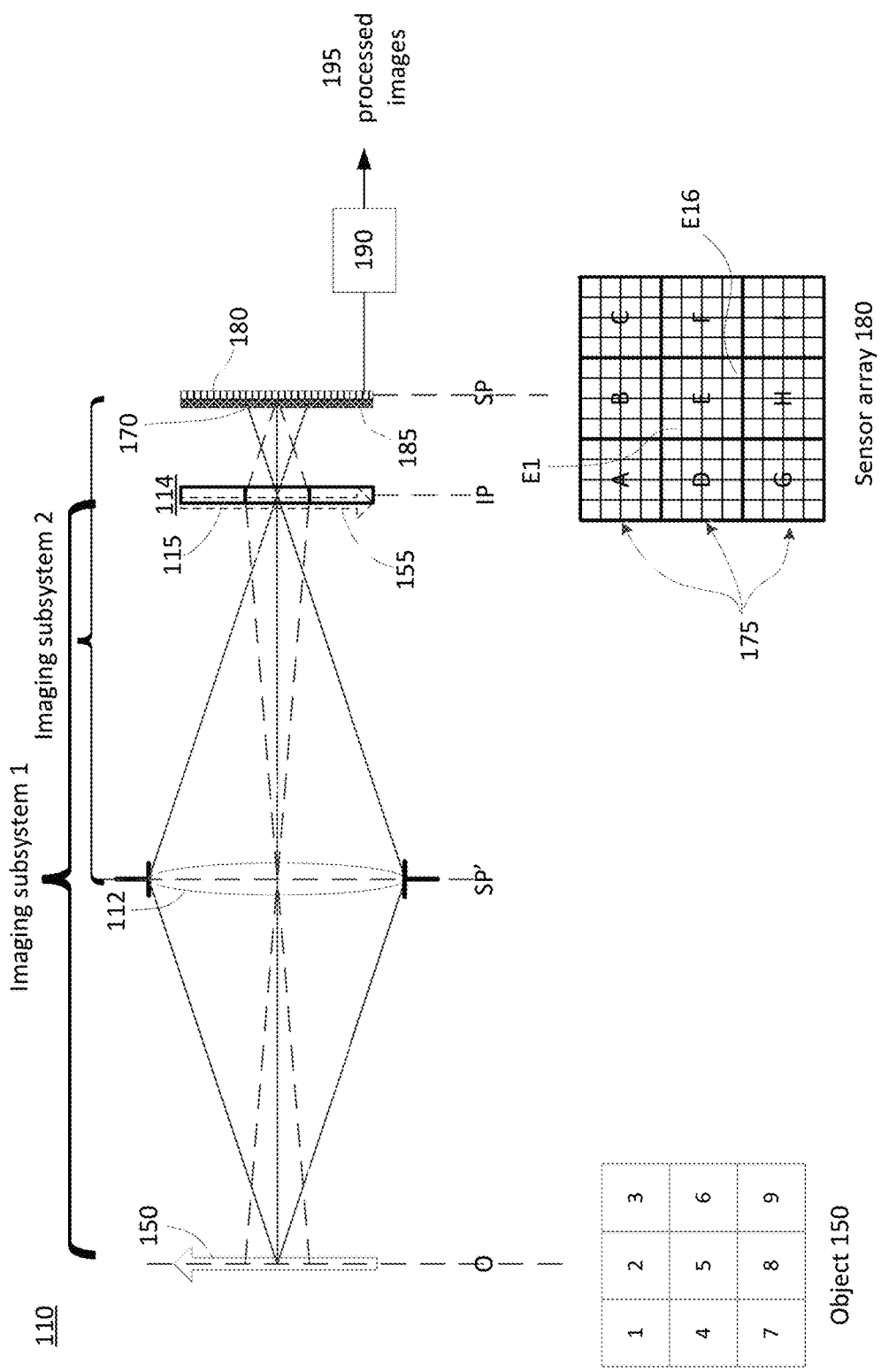
FIG. 1 (prior art) is a diagram of a plenoptic imaging system.

FIG. 1 (prior art) is a diagram illustrating a plenoptic imaging system. The plenoptic imaging system 110 includes imaging optics 112 (represented by a single lens in FIG. 1), a microlens array 114 (an array of microlenses 115) and a sensor array 180. The microlens array 114 and sensor array 180 together may be referred to as a plenoptic sensor module. These components form two overlapping imaging subsystems, shown as subsystem 1 and subsystem 2 in FIG. 1.

For convenience, the imaging optics 112 is depicted in FIG. 1 as a single objective lens, but it should be understood that it could contain multiple elements. The objective lens 112 forms an optical image 155 of the object 150 at an image plane IP. The microlens array 114 is located at the image plane IP, and each microlens images the aperture of imaging subsystem 1 onto the sensor array 180. That is, the aperture and sensor array are located at conjugate planes SP and SP'. The microlens array 114 can be a rectangular array, hexagonal array or other types of arrays. The sensor array 180 is also shown in FIG. 1.

The sensor array 180 includes different color sensors, for example subarrays of red, green and blue color sensors. In some embodiments, this is achieved by use of a color filter array 185. In one example embodiment, the color filter array 185 is a Bayer filter, which is a pattern of red, green and blue color filters. The Bayer filter creates red, green and blue color channels.

The bottom portion of FIG. 1 provides more detail. In this example, the microlens array 114 is a 3×3 array of microlenses 115. The object 150 is divided into a corresponding 3×3 array of regions, which are labeled 1-9. Each of the regions 1-9 is imaged by the imaging optics 112 and imaging subsystem 1 onto one of the microlenses 114. The dashed rays in FIG. 1 show imaging of region 5 onto the corresponding center microlens.

Each microlens 115 images these rays onto a corresponding section of the sensor array 180. The sensor array 180 is shown as a 12×12 rectangular array. The sensor array 180 can be subdivided into microlens footprints 175, labelled A-I, with each microlens footprint corresponding to one of the microlenses and therefore also corresponding to a certain region of the object 150. In FIG. 1, microlens footprint E corresponds to the center microlens, which corresponds to region 5 of the object. That is, the sensors within microlens footprint E capture light from region 5 of the object. The image data captured by the sensors within a microlens footprint will be referred to as a superpixel.

Each superpixel 175 contains light from many individual sensors. In this example, each superpixel is generated from light from a 4×4 array of individual sensors. Each sensor for a superpixel captures light from the same region of the object, but at different propagation angles. For example, the upper left sensor E1 for superpixel E captures light from region 5, as does the lower right sensor E16 for superpixel E. However, the two sensors capture light propagating in different directions from the object. This can be seen from the solid rays in FIG. 1. All three solid rays originate from the same object point but are captured by different sensors for the same superpixel. That is because each solid ray propagates along a different direction from the object.

In other words, the object 150 generates a four-dimensional light field L(x,y,u,v), where L is the amplitude, intensity or other measure of a ray originating from spatial location (x,y) propagating in direction (u,v). Each sensor in the sensor array captures light from a certain volume of the four-dimensional light field. The sensors are sampling the four-dimensional light field. The shape or boundary of such volume is determined by the characteristics of the plenoptic imaging system. For convenience, the (x,y) region that maps to a sensor will be referred to as the light field viewing region for that sensor, and the (u,v) region that maps to a sensor will be referred to as the light field viewing direction for that sensor.

The superpixel 175 is the aggregate result of all sensors that have the same light field viewing region. The view is an analogous concept for propagation direction. The view is the aggregate result of all sensors that have the same light field viewing region. In the example of FIG. 1, the individual sensors A1, B1, C1, . . . I1 make up the upper left view of the object. The individual sensors A16, B16, C16, . . . I16 make up the lower right view of the object. The center view is the view that corresponds to (u,v)=(0,0), assuming that the plenoptic imaging system is an on-axis symmetric system. The centroid of each superpixel/footprint is the point in the superpixel/footprint that corresponds to (u,v)=(0,0). In FIG. 1, the centroid is the center intersection that is labelled A, B, C, . . . I.

Because the plenoptic image 170 contains information about the four-dimensional light field produced by the object, the processing module 190 can be used to perform different types of analysis, such as depth estimation, three-dimensional reconstruction, synthetic refocusing, extending the depth of focus, spectral analysis and other types of multi-view analysis. However, it can be computationally intensive to generate these processed images 195 and it may not be feasible to generate them in real-time.

Figure 2:
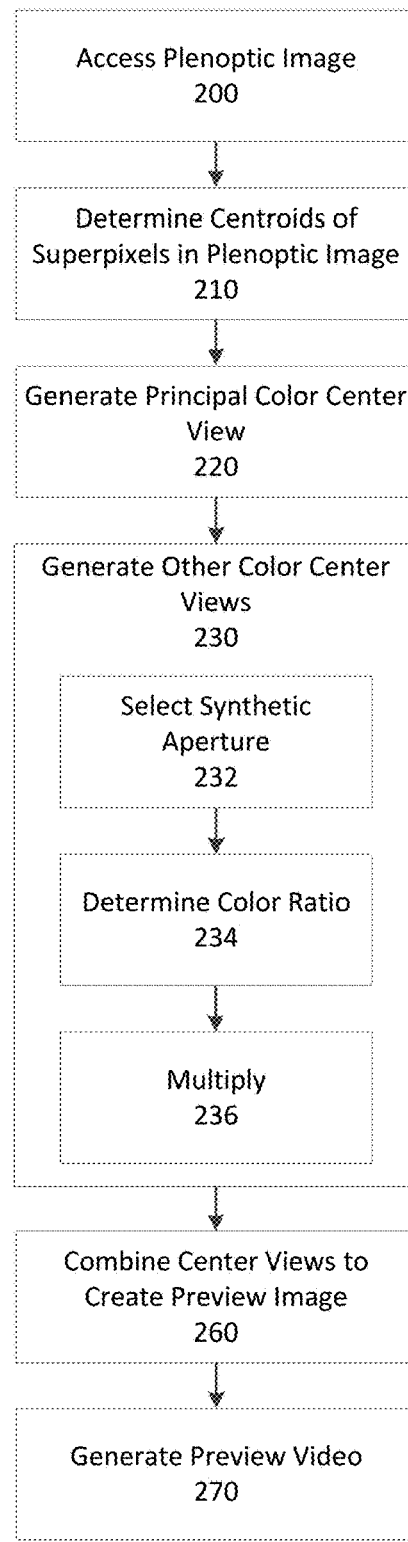
FIG. 2 is a flow diagram of one method for generating a color preview image from captured plenoptic images, according to one example embodiment.

FIG. 2 is a flow diagram of one method for generating a color preview image from captured plenoptic images, according to one example embodiment. This process is explained with reference to FIGS. 3-8. For convenience, the sensor located at the centroid location will be referred to as the centroid or the centroid sensor. In the example described below, the process of FIG. 2 is performed by the plenoptic imaging system 110 (e.g., via the processing module 190). In another embodiment, the process is performed by a computing system separate from the plenoptic imaging system. Other modules may perform some or all of the steps of the process in other embodiments. Likewise, embodiments may include different and/or additional steps, or perform the steps in different orders.

Figure 3A:
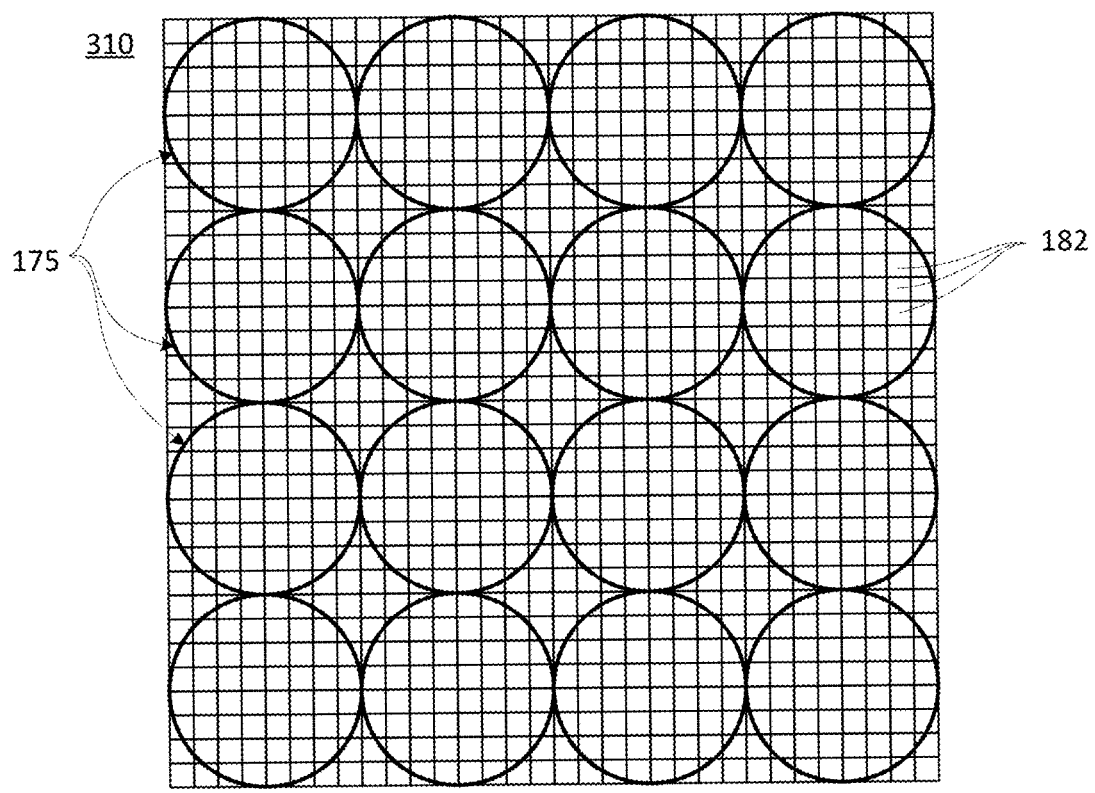
FIG. 3A is an illustration of a plenoptic image with multiple superpixels, according to one example embodiment.

The processing module 190 accesses 200 a plenoptic image captured by the plenoptic imaging system 110 and determines 210 the centroids of the superpixels of the raw plenoptic image. FIG. 3A is an illustration of a plenoptic image 310 with multiple superpixels 175, according to one example embodiment. In FIG. 3A, these superpixels 175 are largely round (as opposed to the square superpixels shown in FIG. 1) because the pupil for the primary optics 112 is round. Each square 182 represents a sensor in the sensor array 180, or a corresponding pixel in the plenoptic image. In this example, a Bayer filter is used so the sensors are either red, green or blue color sensors. The red pixels in the plenoptic image form the red color channel for the plenoptic image, the green pixels form the green color channel, and the blue pixels form the blue color channel.

Figure 3B:
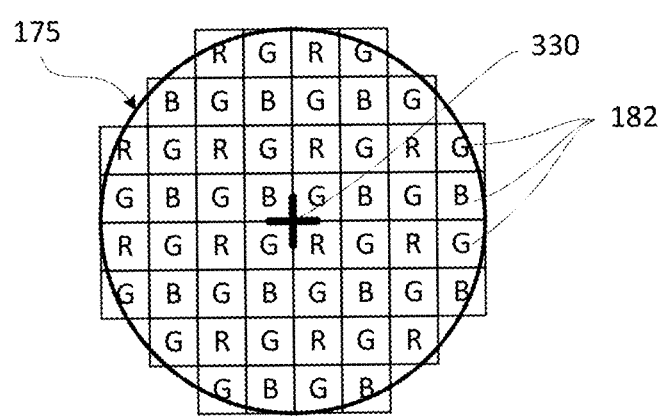
FIG. 3B is an illustration of a centroid location for a superpixel from the plenoptic image of FIG. 3A.
Figure 3C:
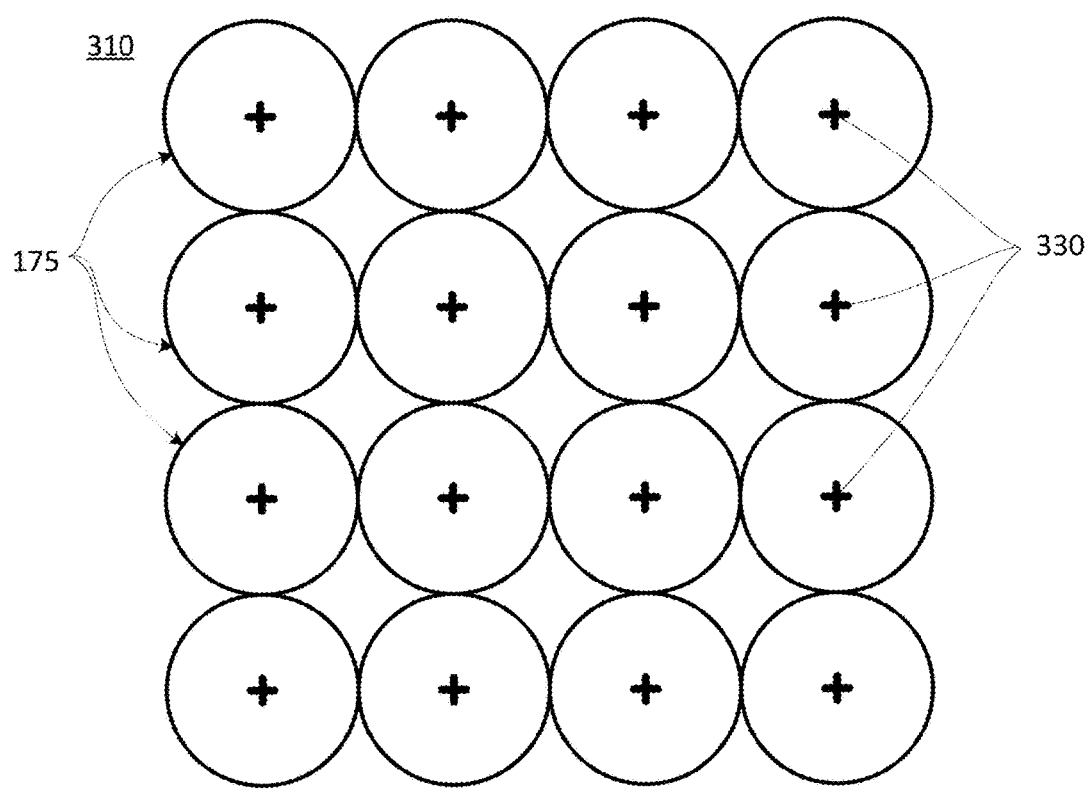
FIG. 3C illustrates the centroids for all the superpixels from the plenoptic image of FIG. 3A.

FIG. 3B is an illustration of a centroid location for a superpixel 175 from the plenoptic image of FIG. 3A. The centroid 330 of each superpixel 175 is the location that corresponds to the center view of the plenoptic image. That is, it corresponds to a light field viewing direction of (u,v)=(0,0) for an on-axis plenoptic imaging system. FIG. 3B illustrates a superpixel 175 with a diameter of eight pixels 182. In this example, the pixels alternate between red (R), green (G) and blue (B) according to the Bayer pattern. The centroid 330 of the superpixel 175 is marked by the "+" in the middle of the superpixel 175. FIG. 3C is a version of FIG. 3A, in which all the centroids 330 have been marked. For clarity, the individual pixels are not shown in FIG. 3C.

The centroids 330 of the superpixels 175 can be determined 210 using a signal power analysis, a geometric analysis, or spectral analysis of each superpixel, for example. Further details for determining centroids are described in co-pending U.S. patent application Ser. No.

15/453,882 "Automatic Centroid Determination of Microlens Arrays in Plenoptic Imaging Systems," which is incorporated by reference herein.

Returning to FIG. 2, the processing module 190 generates 220 a principal color center view from the pixel values of a principal color channel at the centroids of the superpixels. One of the color channels is selected as the principal color. In a Bayer pattern, the green channel has twice as many pixels (sensors) as the red or blue channels, so in this example the green channel is selected as the principal color. Preferably, the channel with the largest number of pixels is selected as the principal color, but that is not required.

Since green is the principal color, the green value at each centroid location is determined. The green pixel values for the centroids of all of the superpixels in the aggregate form a low resolution green image (or, more precisely, the green component of a low resolution color image). This green component is a center view of the object since it is a collection of the green values taken at the centroids of the superpixels. It is referred to as the principal color center view because it is the center view for the principal color. In an example with a 100×100 array of microlenses, the center view can be up to 100×100 pixels without enhancement (i.e. one pixel per microlens). In some embodiments, the resolution of the center view can be enhanced, for example by super-sampling, interpolation, or other methods.

Referring to FIG. 3B, the green pixels in the superpixel 175 may not coincide with the location of the centroid 330. Therefore, the green pixel value at the centroid location 330 may be interpolated from the actual green pixel locations. By interpolating green pixels that are all at the centroid, artifacts due to variations in view (i.e., disparity) may be reduced. Generally this reduced variation is due to the higher number of green pixels as compared to the red and blue color channels. In one approach, a bilinear interpolation can be used to determine the pixel value of the principal color at the centroid 330 of each superpixel 175. For example, assume that the centroid is located at coordinates (i,j), which does not correspond to any green pixels. Note that i and j are not required to be integer in this example. In the superpixel, the four closest green pixels are located at $(i_1,j_1)$, $(i_2,j_1)$, $(i_2,j_1)$, and $(i_2,j_2)$; and their pixel values are given by $G_{11}$, $G_{12}$, $G_{21}$, and $G_{22}$, respectively. The processing module can determine the pixel value at the centroid, $G_{centroid}$, by interpolating in the i-direction and then the j-direction as follows:

$$G_{P1} = \frac{i_2 - i}{i_2 - i_1} G_{11} + \frac{i - i_1}{i_2 - i_1} G_{21} \quad (1)$$

$$G_{P2} = \frac{i_2 - i}{i_2 - i_1} G_{12} + \frac{i - i_1}{i_2 - i_1} G_{22} \quad (2)$$

$$G_{centroid} = \frac{j_2 - j}{j_2 - j_1} G_{P1} + \frac{j - j_1}{j_2 - j_1} G_{P2} \quad (3)$$

$G_{centroid}$ can be described as the approximate green pixel value of the center view based on the green pixel values of nearby views within the superpixel. In another embodiment, the processing module interpolates about the j-direction before the i-direction.

Generally, the bilinear interpolation is performed using pixels on the similar row and column of the centroid. However, the bilinear interpolation can use any pixels of the superpixel such that the value at the centroid may be approximated. In addition, the proximal pixels may be selected based on the power of the signals such that bilinear interpolation will yield a high-quality result (e.g. non-selection of dead sensors or vignetted sensors). Further, interpolation may use more than two pixels in each direction and can interpolate in more or less than two directions (e.g., linear, bicubic and tri-linear interpolation).

In other embodiments, the system may use other methods to approximate the pixel value of the principal color at the centroid, including for example sensor binning, vector analysis, nearest neighbor estimations, proximal sensor substitution (i.e. choosing the pixel value of the green pixel nearest the centroid), sensor averaging, or any other method capable of approximating the pixel value of the principal color at the centroid.

Returning to FIG. 2, the processing module generates 230 center views for the other (non-principal) colors. In one approach, it does so by selecting 232 a "synthetic aperture" for each superpixel, calculating 234 the ratio of a non-principal color to the principal color within that synthetic aperture, and then multiplying 236 the pixel value of the principal color times this ratio to obtain the pixel value for the non-principal color. The pixel values for the non-principal color in the aggregate across all superpixels define a low resolution center view for the non-principal color. The center views for all colors are combined 260 to create the low resolution color preview image.

Figure 4A:
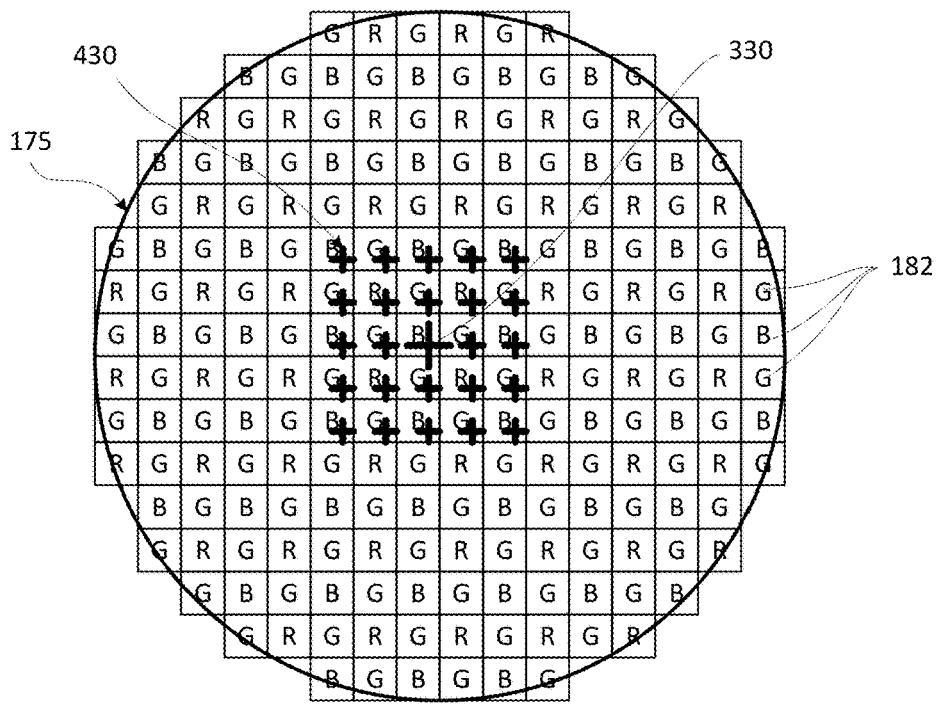
FIGS. 4A and 4B illustrate synthetic apertures, according to various embodiments.
Figure 4B:
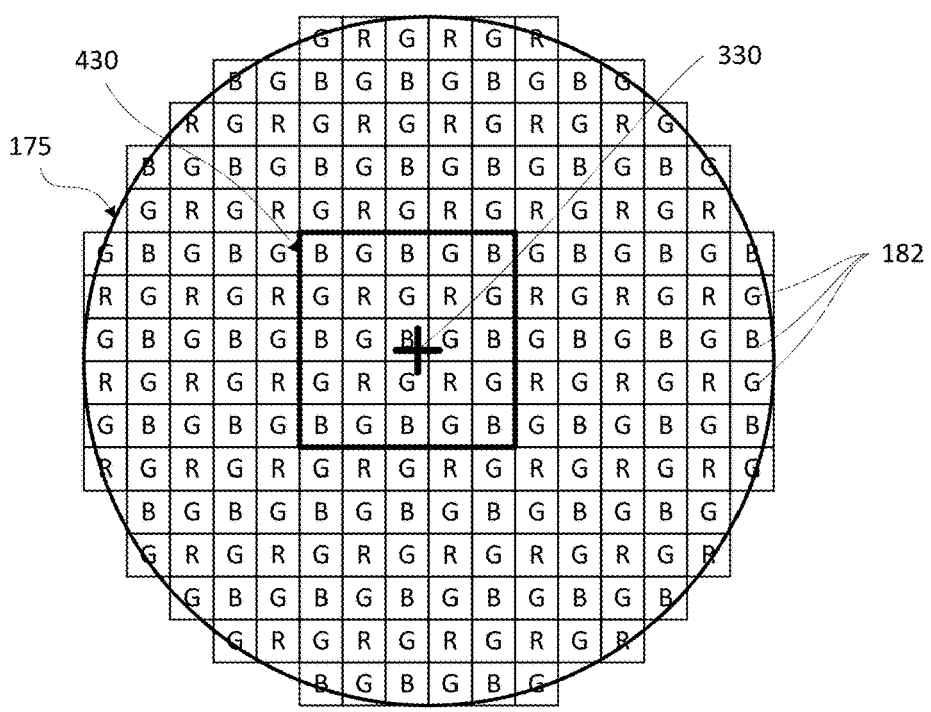

FIGS. 4A and 4B illustrate synthetic apertures, according to various embodiments. In these examples, the superpixel 175 is round with a diameter of 16 pixels 182. The pixels are arranged in a Bayer pattern. The centroid 330 is denoted by the large "+". Note that the centroid is not coincident with the grid defining the pixels 182. That is, if the pixels are located at integer coordinates 1, 2, 3, etc., the centroid 330 is located at a fractional coordinate, e.g., 8.25. In this example, the synthetic aperture is selected 232 as a 5×5 region centered on the centroid 330, which is represented in FIG. 4A by the full set 430 of "+"s.

Using the red color as an example, the color ratio for the red channel can be calculated 234 as follows. Green pixel values are interpolated at each of the "+" locations. Red pixel values are interpolated at each of the "+" locations. The red/green color ratio is calculated as the average red pixel value divided by the average green pixel value. The blue/green color ratio can be calculated 234 similarly.

In FIG. 4A, the "+" locations were off-grid, which introduced some additional calculation. In FIG. 4B, the synthetic aperture 430 is selected to be aligned with the grid of pixels, even though this makes it slightly off-center relative to the centroid 330. In this example, the synthetic aperture 430 is selected to be the 5×5 collection of pixels enclosed by the square with thick outline. The red/green and blue/green color ratios can be calculated based on the pixel values within the synthetic aperture 430. Preferably, the color ratios are calculated based on "high-quality" pixel values, for example those with low noise and low vignetting.

In many cases, superpixels are not perfectly aligned with the underlying sensor array. The plenoptic image may have a rotation relative to the sensor array, and a pitch of the superpixels within the plenoptic image may not be an integer number of sensors. In one approach, the plenoptic image is normalized for these effects before further processing. For example, the normalization may remove rotational misalignment and may scale the superpixel so that it is an integer number of pixels wide. Then calculations such as shown in FIGS. 4A-4B can be simplified.

FIGS. 4A and 4B show the synthetic aperture for one superpixel. The same size and shape synthetic aperture can be used for all superpixels or different synthetic apertures can be used for different superpixels. The size and shape of superpixels and the location of the centroid within the superpixel can vary over the plenoptic image. On-axis superpixels may be more circular and have larger area, while off-axis superpixels may be more elliptical and have smaller area due to vignetting or other aberrations. The centroid may be located closer to the geometric center of on-axis superpixels compared to off-axis superpixels. For all these reasons, different synthetic apertures may be used for different superpixels.

Figure 5A:
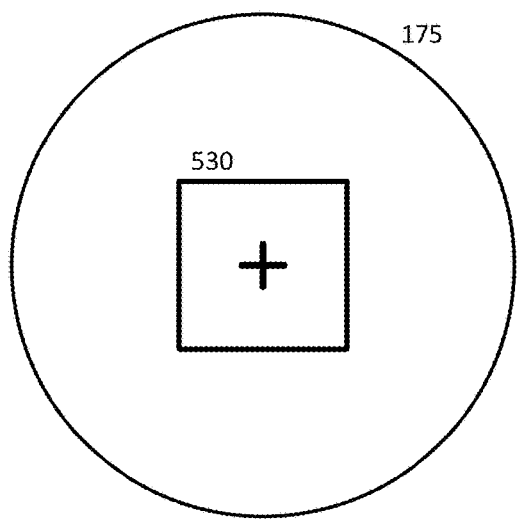
FIGS. 5A-5D illustrate more examples of synthetic apertures, according to various embodiments.
Figure 5B:
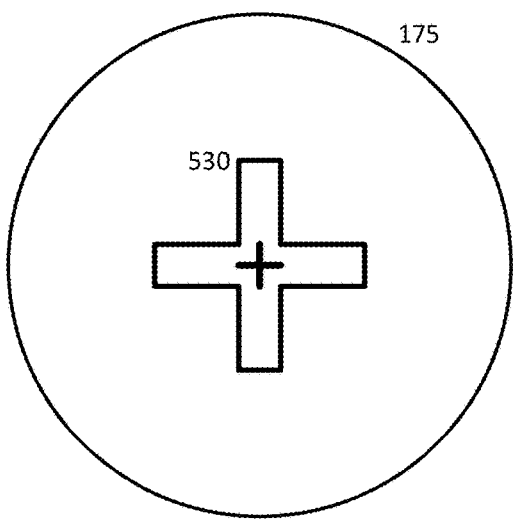
Figure 5C:
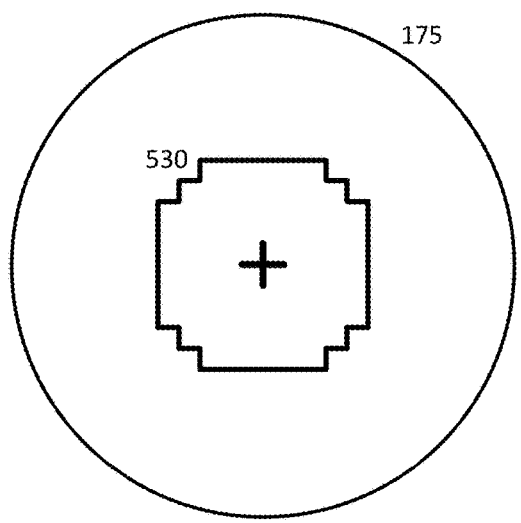
Figure 5D:
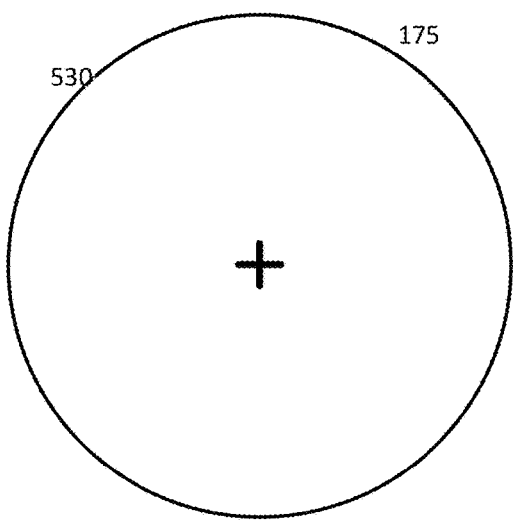

FIGS. 5A-5D illustrate some examples of synthetic apertures. In FIG. 5A, the synthetic aperture 530 is a square shape. In FIG. 5B, the synthetic aperture 530 is a cross shape extending in the x and y directions. In one embodiment, the arms of the cross are two pixels wide to make better use of the Bayer color pattern. In FIG. 5C, the synthetic aperture 530 includes the nearest neighbor pixels. In FIG. 5D, the synthetic aperture 530 includes all pixels in the superpixel, or at least all of the high-quality pixels. In some cases, the color ratio for one superpixel may be based on pixels from an adjacent superpixel, for example when the pixel quality within the superpixel is too bad. Further, the color ratios for adjacent superpixels can be used to reduce noise artifacts, for example when the pixel within the superpixel is too bad.

By multiplying 236 the color ratios for each non-principal color channel times the principal color center view, the processing module can generate 230 center views for each of the non-principal colors. In the RGB example, the color components for the color preview image can be defined as:

$$G_{Preview}(n,n) = G_{Centroid}(m,n) \quad (4)$$

$$R_{Preview}(m,n) = G_{Centroid}(m,n) * Ratio_{R/G}(m,n) \quad (5)$$

$$B_{Preview}(m,n) = G_{Centroid}(m,n) * Ratio_{B\_G}(m,n) \quad (6)$$

where (m,n) are the indices for the superpixels, $G_{Centroid}$(m.n) is the center view for the principal color (green), and $Ratio_{R/G}$(m,n) and $Ratio_{B/G}$(m,n) are the color ratios for red-to-green and blue-to-green, respectively. The calculated quantities $G_{centroid}$(m,n)*$Ratio_{R/G}$(m,n) and $G_{Centroid}$(m,n) *$Ratio_{B/G}$(m,n) are approximations of the center views for the red and blue colors.

Figure 6A:
FIGS. 6A and 6B are images of the red channel approximated using bilinear interpolation and color ratios, respectively.
Figure 7A:
FIGS. 7A and 7B are images of the blue channel approximated using bilinear interpolation and color ratios, respectively.
Figure 6B:
Figure 7B:

FIGS. 6-7 show examples of this approximation of the red and blue channels. FIG. 6A shows a red center view estimated using bilinear interpolation of red pixels from the plenoptic image, similar to how the green center view is estimated. FIG. 6B shows a red center view estimated using Eqn. 5 above. Similarly, FIG. 7A shows a blue center view estimated using bilinear interpolation of blue pixels from the plenoptic image, and FIG. 7B shows a blue center view estimated using Eqn. 6 above. In FIGS. 6A and 7A, the center views estimated using bilinear interpolation exhibit streaky artifacts that are the result of the low sampling rate of the red and blue pixels. The center views of FIGS. 6B and 7B are improved because the fine image detail is provided by the higher sampling rate of the green pixels.

The preview components defined by Eqns. 4-6 can be combined 260 as the red, green and blue components of the color preview image. In alternate embodiments, the preview image can use other image data determined from the pixel values of the plenoptic image to generate preview images. For example, the system may determine a brightness, chroma, luminance, hue, etc. and generate a color preview image further based on these values.

In some cases, the plenoptic imaging system is capturing video. That is, plenoptic images are captured at video rate. Preferably, the plenoptic imaging system captures raw plenoptic images, processes the views, and creates 270 a color preview video such that the preview images are created at the same frame rate as the capture of the plenoptic video. If the imaging system is capturing 15 or more frames per second, then the processing module has 66 ms or less to create the color preview frame for real-time operation. Therefore, approaches that reduce computation requirements will help to meet the desired frame rate. For example, reducing the requirement for interpolation and reducing the number of pixels processed in a synthetic aperture will both reduce the computation burden. The generated color preview video provides a real-time preview of what the plenoptic imaging system is capturing.

Figure 8:
FIG. 8 is a color preview image for a light field otoscope, according to one example embodiment.

FIG. 8 is a color preview image for a light field otoscope, according to one example embodiment. In this example, a light field otoscope captures plenoptic images of the interior of the ear. The captured plenoptic images are processed as described above to generate a color preview image, as shown in FIG. 8. The color preview video allows the physician to guide the otoscope to capture images of the eardrum or other relevant anatomical features. For example, a plenoptic imaging system used as an otoscope in a medical procedure may have the following specifications: a microlens size of 55 a sensor array size of 3376×2704 pixels (i.e. 9 Mega pixels), an individual pixel size of 3.7 and a frame rate for the preview video of 15-18 frames per second. These are just an example. Other embodiments may have different specifications.

Generally, the color preview images (i.e. frames of the preview video) have a resolution that does not exceed the number of microlenses in the microlens array, which is significantly less than the total number of sensors in the sensor array. However, in some embodiments, various methods can be used to increase the resolution of the images above the number of microlenses in the array. Some examples include super-resolution, sub-sensor sampling, interpolation, resampling, box sampling, and vectorization.

Although the detailed description contains many specifics, these should not be construed as limiting the scope of the invention but merely as illustrating different examples and aspects of the invention. It should be appreciated that the scope of the invention includes other embodiments not discussed in detail above. For example, this method can be applied to any view of the plenoptic image rather than just to the center view, i.e. (u,v)≠(0,0). Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. For a plenoptic imaging system comprising imaging optics, a microlens array and a sensor array, the sensor array including a plurality of subarrays of different color sensors, a method for generating real-time color preview images, the method comprising:
    accessing a plenoptic image captured by the plenoptic imaging system, the plenoptic image including superpixels corresponding to the microlenses in the microlens array and also including different color channels captured by the subarrays of different color sensors;
    for a principal color channel, determining pixel values for that principal color channel at centroids of the superpixels, said pixel values in the aggregate forming a principal color center view;
    for each of the other color channels:
        determining color ratios of that color channel to the principal color channel at centroids of the superpixels; and
        determining pixel values for that color channel by multiplying said color ratios with the pixel values for the principal color channel, said determined pixel values in the aggregate forming a center view for that color channel; and
    combining the center views of the different color channels to create a color preview image.

2. The method of claim 1, wherein the plenoptic imaging system captures plenoptic video comprising frames of plenoptic images, and the color preview images are created at a same frame rate as the capture of the plenoptic video.

3. The method of claim 1, wherein the plenoptic imaging system captures plenoptic video comprising frames of plenoptic images, and the color preview images provide a real-time preview of what the plenoptic imaging system is capturing.

4. The method of claim 1, wherein the color preview image has a resolution that does not exceed the number of microlenses in the microlens array.

5. The method of claim 1, wherein the color preview image has a resolution that is significantly lower than the total number of sensors in the sensor array.

6. The method of claim 1, wherein the principal color channel is the color channel with the largest number of sensors.

7. The method of claim 1, wherein determining the pixel values for the principal color channel at centroids of the superpixels comprises interpolating pixel values of the principal color channel from the plenoptic image.

8. The method of claim 7, wherein the interpolation is a bilinear interpolation.

9. The method of claim 1, wherein determining color ratios of another color channel to the principal color channel comprises, for synthetic apertures that include the centroids, calculating a ratio of the other color channel contained in the synthetic aperture to the principal color channel contained in the synthetic aperture.

10. The method of claim 9, wherein the synthetic aperture is contained within the corresponding superpixel.

11. The method of claim 9, wherein the synthetic aperture is equivalent to the corresponding superpixel.

12. The method of claim 9, wherein the color ratio for at least one of the superpixels is also used as the color ratio for an adjacent superpixel.

13. The method of claim 9, wherein the synthetic apertures are the same shape and size for all superpixels.

14. The method of claim 9, wherein the synthetic apertures are sized to avoid sensors that are vignetted.

15. The method of claim 9, wherein the synthetic apertures are centered on the centroids.

16. The method of claim 1, wherein the centroids of the superpixels are the centermost sensors of the superpixels.

17. The method of claim 1, wherein the accessing the plenoptic image comprises accessing a normalized version of the plenoptic image captured by the plenoptic imaging system, the normalized image normalized for pitch between adjacent microlenses and rotation of the microlens array relative to the sensor array.

18. The method of claim 1, wherein the sensor array includes a Bayer filter array, and the different color channels include a red channel, a green channel and a blue channel.

19. The method of claim 1 wherein generating the color preview image is further based on luminance values obtained from the sensors.

20. A non-transitory computer-readable storage medium storing executable computer program instructions for generating real-time color preview images from a plenoptic imaging system comprising imaging optics, a microlens array and a sensor array, the sensor array including a plurality of subarrays of different color sensors, the instructions executable by a processor and causing the processor to perform a method comprising:
    accessing a plenoptic image captured by the plenoptic imaging system, the plenoptic image including superpixels corresponding to the microlenses in the microlens array and also including different color channels captured by the subarrays of different color sensors;
    for a principal color channel, determining pixel values for that principal color channel at centroids of the superpixels, said pixel values in the aggregate forming a principal color center view;
    for each of the other color channels:
        determining color ratios of that color channel to the principal color channel at centroids of the superpixels; and
        determining pixel values for that color channel by multiplying said color ratios with the pixel values for the principal color channel, said determined pixel values in the aggregate forming a center view for that color channel; and
    combining the center views of the different color channels to create a color preview image.

* * * * *